(12) United States Patent
Grigoleit et al.

(10) Patent No.: US 8,739,681 B2
(45) Date of Patent: Jun. 3, 2014

(54) VALVE APPARATUS

(75) Inventors: Axel Grigoleit, Laichlingen (DE); Bernhard Steinmann, Gersheim (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 924 days.

(21) Appl. No.: 12/734,563

(22) PCT Filed: Aug. 26, 2008

(86) PCT No.: PCT/EP2008/006976
§ 371 (c)(1),
(2), (4) Date: May 10, 2010

(87) PCT Pub. No.: WO2009/062558
PCT Pub. Date: May 22, 2009

(65) Prior Publication Data
US 2010/0229970 A1    Sep. 16, 2010

(30) Foreign Application Priority Data
Nov. 13, 2007   (DE) .................. 10 2007 054 503

(51) Int. Cl.
*F16K 15/00*    (2006.01)
(52) U.S. Cl.
USPC .......................................... 91/465

(58) Field of Classification Search
USPC ............................................. 91/371, 422, 465
See application file for complete search history.

(56) References Cited

U.S. PATENT DOCUMENTS

| | | | | | |
|---|---|---|---|---|---|
| 4,747,337 | A | * | 5/1988 | Ohota | 91/420 |
| 5,737,992 | A | * | 4/1998 | Torrekens et al. | 91/59 |
| 6,003,428 | A | * | 12/1999 | Mundie et al. | 91/459 |
| 6,038,948 | A | * | 3/2000 | Link et al. | 82/147 |

FOREIGN PATENT DOCUMENTS

| | | |
|---|---|---|
| DE | 38 36 453 A1 | 7/1989 |
| DE | 195 30 131 C1 | 9/1996 |
| EP | 1 068 932 A2 | 1/2001 |
| WO | WO 2005005842 A1 * | 1/2005 |

* cited by examiner

*Primary Examiner* — Ned Landrum
*Assistant Examiner* — Logan Kraft
(74) *Attorney, Agent, or Firm* — Roylance, Abrams, Berdo & Goodman, L.L.P.

(57) ABSTRACT

A valve apparatus for setting and monitoring the clamping pressure of a clamping device (9) for workpieces to be clamped, in particular in lathes, has at least one pressure control valve (1A, 1B) for setting the clamping pressure, and has at least one pressure sensor (6A, 6B) detecting the clamping pressure. The clamping pressure is adjusted in relation to a predefinable setpoint clamping pressure. The valve apparatus can set the clamping pressure for safety and monitor it to maintain or reduce it during the machining.

22 Claims, 3 Drawing Sheets

VALVE APPARATUS

FIELD OF THE INVENTION

The invention relates to a valve apparatus for setting and monitoring the clamping pressure of a clamping device for workpieces to be clamped, particularly in lathes.

BACKGROUND OF THE INVENTION

In modern machine tools, for example lathes, the workpieces to be machined are generally clamped by clamping devices which can be hydraulically actuated, particularly by clamping cylinders, and/or are secured tightly by tailstock spindle sleeves which can be hydraulically actuated. The respective machine is released only after the clamping pressure is reached. If, at this point during machining with the machine tool, the clamping pressure on the clamping device is reduced due to a fault, this reduction can lead to loosening of the clamping device. The subsequently released workpiece can cause serious damage to the machine and constitutes a considerable safety risk for the machine operator.

In addition to this monitoring of the clamping pressure to ensure safe clamping forces, it can also be advantageous to reduce the clamping pressure, and therefore the clamping force, to prevent damage to the machined workpiece if it acquires a wall thickness geometry that has been reduced from "full bored," for example, as a result of the type of machining. The clamping force remaining the same relative first of all to the solid material used would lead to the deformation of workpiece geometries that are reduced in wall thickness, and therefore, are weakened.

SUMMARY OF THE INVENTION

An object of the invention is to provide an improved valve apparatus for clamping accommodation of workpieces to be machined in machine tools such as lathes, with increased safety and to prevent inadvertent damage to the workpiece.

This object is basically achieved according to the invention by a valve apparatus with at least one pressure control valve via which a clamping pressure adjustment for the clamping device takes place. At least one pressure sensor detects the respective clamping pressure of the clamping device to be adjusted to a definable setpoint clamping pressure. With this valve apparatus, it is possible to set the clamping pressure which is relevant to safety engineering and to monitor it during machining for purposes of adjustment, in particular to maintain or reduce it uniformly.

Using the respective pressure sensor, the current pressure of the clamping device is measured, whether in the form of the clamping cylinder which is to be hydraulically actuated or in the form of a tailstock spindle sleeve which is to be hydraulically actuated. This current clamping pressure should then correspond to a predefined setpoint clamping pressure which can be predefined by the control, for example, in the form of a machine control for the machine tool. By triggering the pressure control valve, preferably in the form of a pressure reducing valve, the pressure of the clamping device can be set to constant pressure values or even reduced by triggering the control. Since, essentially for each workpiece to be machined according to the desired machining state, there are other clamping pressure constraints, they are defined in near real time as a setpoint clamping pressure by the control of the machine as machining progresses. This arrangement ensures reliable clamping force monitoring to prevent the workpiece from unintentionally coming loose from the clamping device.

Furthermore, the clamping force can be reduced to protect the workpiece during machining against damage from a clamping-compressive force that has been set too high.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
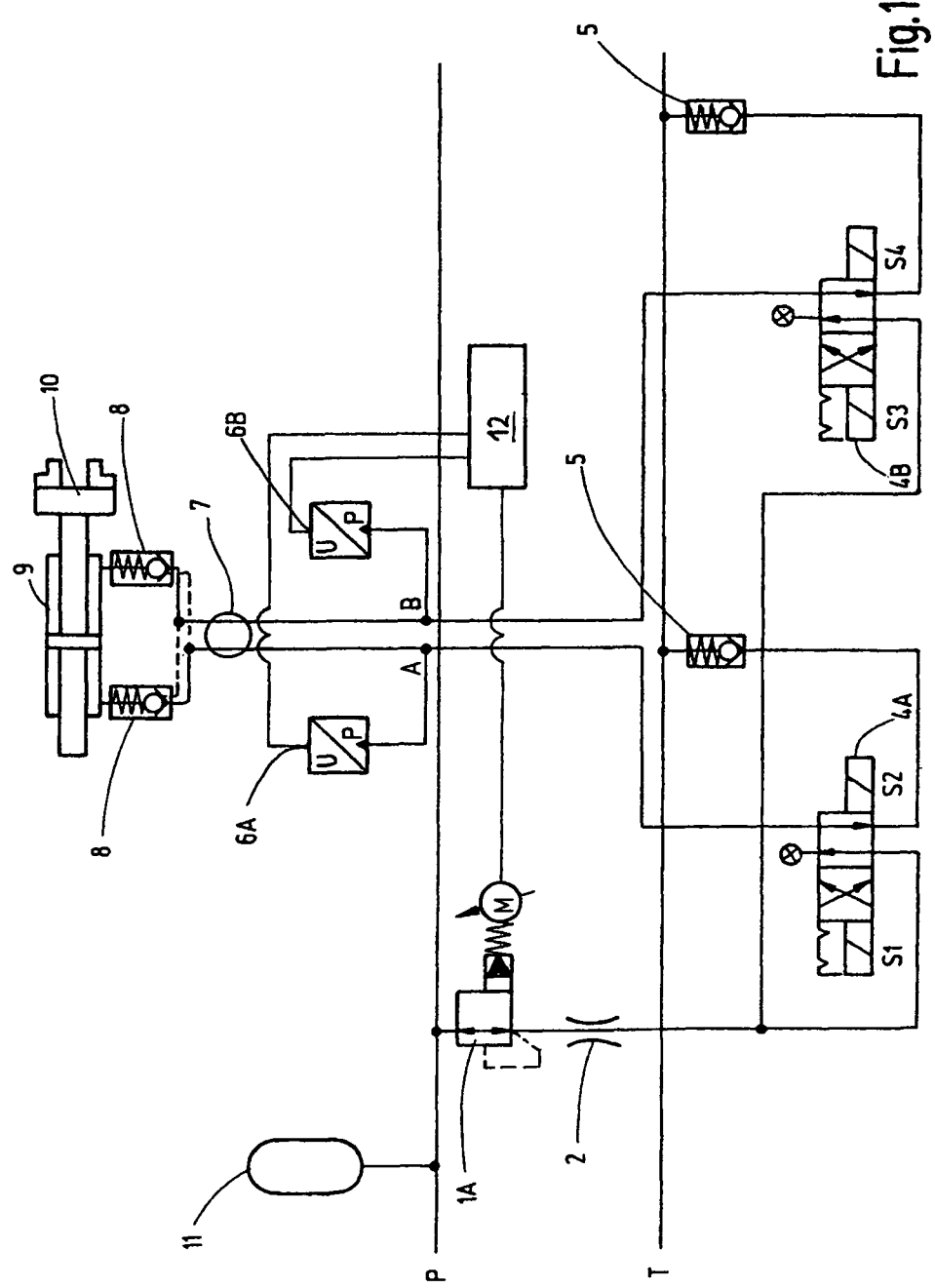
FIG. 1 is a schematic hydraulic diagram of a valve apparatus according to a first exemplary embodiment of the invention using a pressure control valve.

In the three embodiments, fundamentally comparable components, in particular valve components, are used and designated with the same reference numbers. The main components are as follows:

1A, 1B pressure control valves with mechanical self-locking,
2 orifice,
4A, 4B directional control valves with latching (self-retaining) positions,
5 back pressure block in the form of a check valve,
6A, 6B pressure sensors,
7 rotary duct,
8 two check valves,
9 clamping cylinder made as a synchronous cylinder,
10 clamping chuck with small transmission ratio (without self-locking),
11 hydraulic accumulator, and
12 control.

The clamping cylinder 9 is made as a hydraulic synchronous cylinder. The jaws of the clamping chuck 10 in one direction of motion are moved toward one another and in the opposite direction are moved away from one another. In this way, a workpiece to be machined (not shown) can be detachably fixed with a hydraulic actuation force both by the inside diameter and in the other actuation direction by the outside diameter of the clamping jaws of the clamping chuck.

The rotary duct 7 allows pivoting of the clamping device in at least one axis of motion or pivoting. These rotary ducts for hydraulic feed and drain lines are known in the prior art in a plurality of embodiments so that they will not be detailed any further here. In any case, it is ensured by the rotary duct 7 that hydraulic supply of the working spaces of the clamping cylinder 9 takes place even when the clamping cylinder 9 is being pivoted with the clamping chuck 10. The clamping device includes the clamping cylinder 9 and the clamping chuck 10 is shown merely by way of example. Different types of clamping devices (tailstock spindle sleeves) can likewise be used for the valve apparatus.

The orifice 2 on the output side of the respective pressure control valve 1A, 1B is used to adapt the volumetric flow to the volumetric size of the clamping cylinder 9, which, depending on the type of machining, can also be different for a machine tool. The fluid line P is connected to a hydraulic supply (not detailed), for example is formed from a hydraulic supply pump. The hydraulic accumulator 11 is connected to the pump line P and provides pressure supply to the system when the power fails. The tank connecting line or tank line T allows return of the working medium in the form of hydraulic oil into the tank, from where hydraulic supply can take place via the pump with the formation of a hydraulic circuit. This arrangement is also conventional so that it will not be detailed any further.

In the embodiment as shown in FIG. 1, the clamping pressure for the clamping cylinder 9 can be set by the pressure control valve 1A with mechanical self-retaining. The value can be displayed on the digital display of a conventional electronic control 12, which display is not detailed. To set the predefinable clamping pressure value, this control 12, shown in FIG. 1 as a black box, triggers the motor M of the pressure control valve 1A which moreover is connected to the pressure sensors 6A, 6B to detect the actual pressure prevailing in the utility connections A, B, which are, in turn, each connected to the pertinent working spaces of the clamping cylinder 9 to carry fluid via the check valves 8. By the control 12, the operator can freely stipulate the corresponding pressure values for the pressure control valve 1A, or triggering takes place by a corresponding program for control 12. For different workpieces to be clamped, different programming is provided which, in turn, is freely selectable within a definable framework. The predefined pressure, set by hand or by the respective machine control program, is therefore accepted in this respect and is continuously monitored within the framework of further machining. If the clamping pressure on the clamping cylinder 9 then drops, for example, as a result of technical failure, this drop can be detected by the respectively assignable pressure sensor 6A, 6B. A corresponding error message then travels to the control 12 to shut off the assignable machine drive on the metal-cutting machine for the clamping device. This stoppage takes place in near real time. In this way, damage to the metal-cutting machine and/or the workpiece to be machined is avoided. Depending on the programming, the clamping pressure can be monitored both for internal clamping and for external clamping by the clamping chuck 10 of the clamping cylinder 9.

While setting of the clamping pressure takes place on the valve 1A, the actual taking takes place by actuating the valve 4A, while the valve 4B is not actuated. The valves 4A, 4B used are made in the form of directional control valves with locking (self-locking) positions. They can be shifted into the respective actuating positions by assignable electrical control magnets S1, S2, S3, and S4 to be able to move the clamping cylinder 9. If the valve 4A has been actuated, the clamping pressure is monitored by the pressure sensor 6A. Conversely, at the same time there should not be any back pressure on the pressure sensor 6B. Otherwise, this back pressure would be an indication of a malfunction. If the clamping cylinder 9 is to be relieved, in order, for example, to release the workpiece to be machined, switching of valve 4B then takes place while valve 4A is switched back into its initial position. As FIG. 1 shows, one output of the respective directional control valve 4A, 4B is blocked fluid-tight by a corresponding sealing plug since in this respect this output is not necessary for the valve function intended.

According to the operating description as shown in FIG. 1, the two check valves 8 are interconnected such that they are connected to be able to be mutually unblocked and are connected on their blocking inlet side both to the assignable utility connection A and to the utility connection B. The back pressure block 5, which is made as a check valve, prevents a dynamic pressure which may build up in the tank line T from unintentionally changing the clamping force on the clamping cylinder 9. The valve components used for the valve apparatus according to the invention are standard components and can be economically made available and are reliable in use. Furthermore, the pressure control valve 1A on the one hand is connected to the fluid line P with the hydraulic accumulator 11 and is connected to the directional control valves 4A and 4B respectively to carry fluid by way of the orifice 2.

With the valve apparatus described and as shown in the circuit of FIG. 1, when the clamping pressure drops, the machine can be shut down to meet increased safety requirements. Moreover, the solution as shown in FIG. 1 allows a reduction of the clamping force to help avoid deformations of the workpiece during machining which can arise, for example, as a result of a solid profile workpiece being initially clamped, which workpiece then becomes a hollow profile in metal cutting, with reduced wall thickness which could otherwise be deformed when the clamping force remains the same.

For this purpose, the exemplary embodiment as shown in FIG. 1, sets the clamping pressure on the valve 1A preferably made as a proportional pressure reducing valve. A clamping process by the clamping cylinder 9 takes place by actuating the valve 4A, while the valve 4B remains in its position shown in FIG. 2. In the utility connection A the clamping pressure is then monitored on the pressure sensor 6A, while at the same time there should be little or no back pressure on the pressure sensor 6B. Relief then takes place by switching the valve 4B, while the valve 4A is, in turn, switched back into the initial position as shown in FIG. 1. Within the scope of this specification, it is fundamentally assumed that, by applying pressure in the utility line A with simultaneous discharge of hydraulic oil from the utility line B, a clamping process is initiated via the clamping cylinder 9 and the clamping chuck 10. By reversing this function, a relief process is carried out. When there is a change from inside clamping to outside clamping relative to the clamping jaws of the clamping chuck 10, the aforementioned statements then apply in reverse.

For reducing the clamping pressure with only one pressure regulator 1A as shown in FIG. 1, as already described, the clamping pressure is set on the valve 1A by the control 12, and relief takes place by switching of valve 4A. At the same time, monitoring of the clamping pressure takes place by the pressure sensors 6A, 6B which relay their values to the control 12 of conventional design. If at this point the valve 4B is switched, the clamping pressure in the utility lines A, B is equalized, the check valves 8 are both opened, and pressure equalization takes place in the clamping cylinder 9. Since self-locking does not occur in the clamping chuck, the clamping force is lowered to zero.

The level of the clamping pressure on the pressure regulator 1A can now be lowered to the desired level, and the clamping pressure drops in lines A and B and, as a result of the opened check valve 8, also drops in the clamping cylinder 9. The clamping force then remains at zero. After completed switching back of the valve 4B, the pressure in the utility line B and on the relief side of the clamping cylinder 9 is reduced, and the clamping force is built up again at a lower level on the clamping chuck 10 by the prevailing pressure in the utility line A. In this way, the indicated minimization of the clamping force is achieved.

Figure 2:
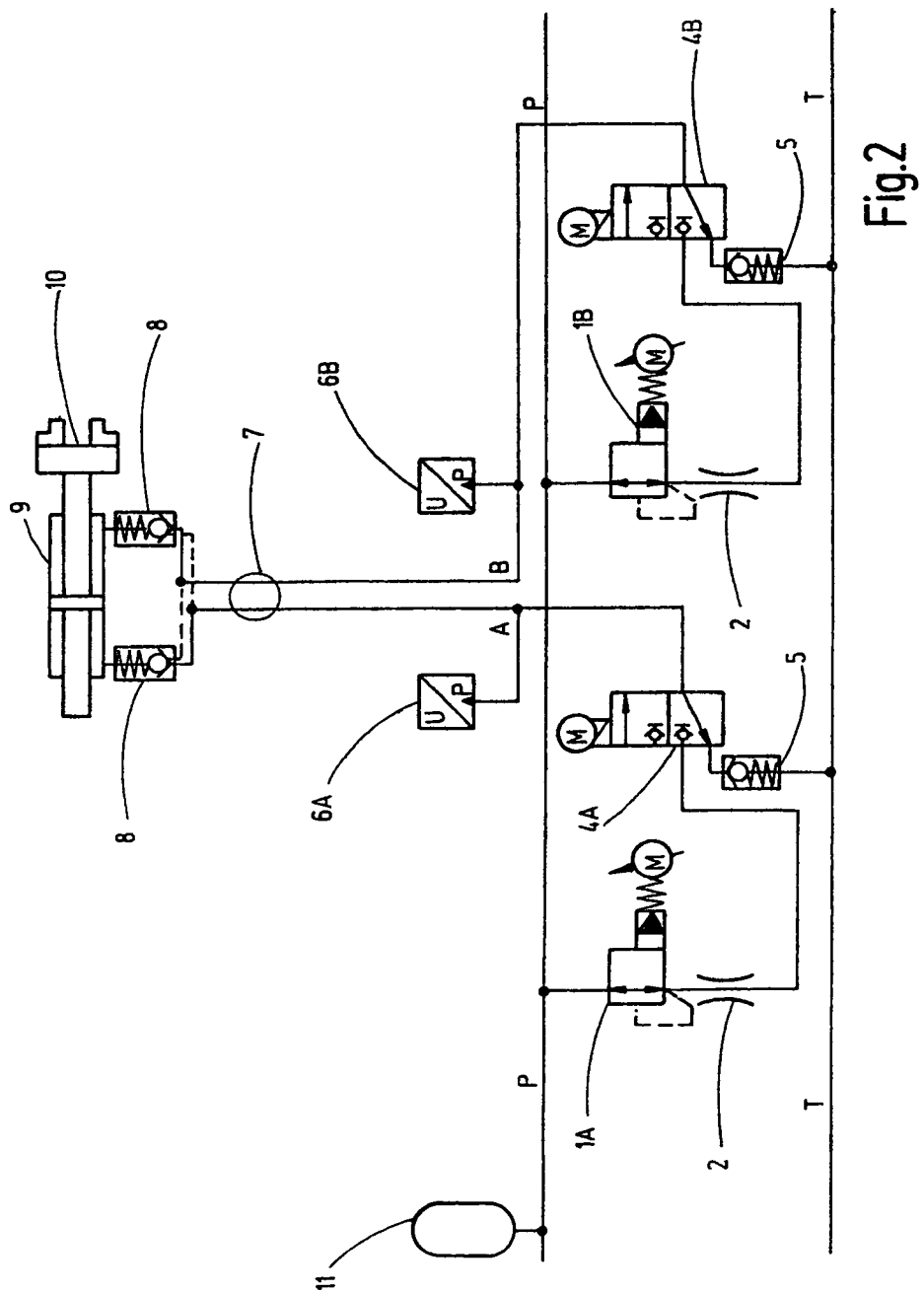
FIG. 2 is a schematic hydraulic diagram of a valve apparatus according to a second exemplary embodiment of the invention using two pressure control valves.

The solution as shown in FIG. 1 therefore uses two 4/2 directional control valves 4A, 4B, of which, viewed in the direction of FIG. 2, the output on the left leads into a blind connection. Furthermore, the valves 4A, 4B are connected to the respectively assignable back pressure block 5 connected to the tank line T respectively. The outputs of the pressure sensors 6A, 6B are connected to the machine control 12 shown as a black box for reducing the clamping pressure force for evaluation of the respective measurement signal. The control 12 for stipulation of a pressure setpoint has a manual input which is not detailed or has a freely programmable flow diagram (program).

If it should not be possible to ensure that, when the clamping pressure is equalized, the friction is sufficient for actually holding the workpiece in the clamping chuck 10, the embodiment as shown in FIG. 2 with two pressure regulators 1A, 1B would be appropriate. This reduction of the clamping pressure then calls for a pressure just below the level in the utility line A to be set on the pressure control valve 1B. With the switching of valve 4B, a back pressure is then built up in the utility line B, and the check valves 8 are both opened. Since self-locking does not occur in the clamping chuck 10, the clamping force is reduced to a low value. As a result, the pressure on the valves 1A and 1B is lowered until the desired level is reached in the utility line A. The pressure difference between the valves 1A and 1B must be maintained in this process. Owing to the opened check valves 8, the clamping pressure also drops in the clamping cylinder 9 with the result that the clamping force remains at a constant low level.

By switching back the valve 4B, the pressure in the utility line B and on the relief side of the clamping cylinder 9 is reduced. The clamping force is then built up again at a lower level on the clamping chuck 10 by the pressure in the utility line A.

Instead of using 4/2 directional control valves, the embodiment as shown in FIG. 2 is equipped with motorized 3/2 directional control valves 4A, 4B. Furthermore, the 2-way pressure regulators shown in FIGS. 1 and 2 can also be replaced by 3-way pressure regulators.

Figure 3:
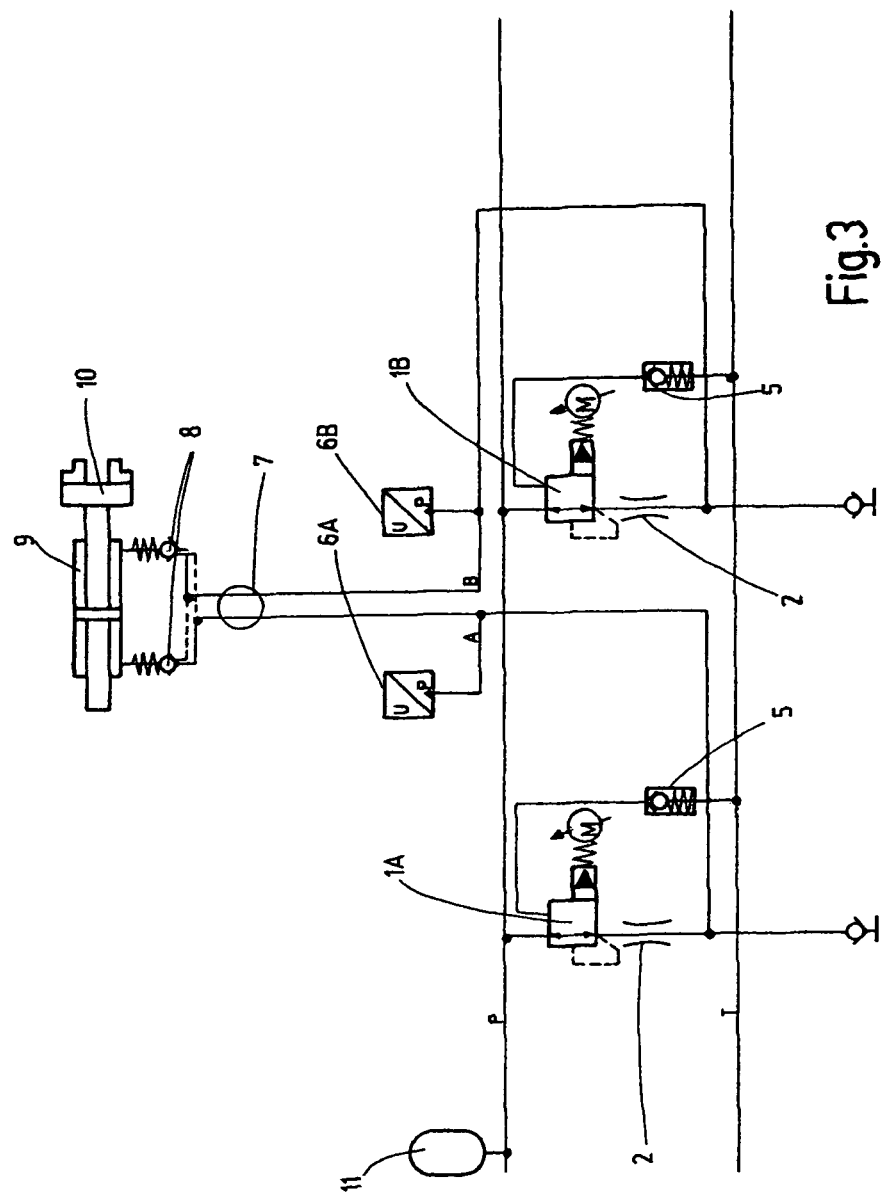
FIG. 3 is a schematic hydraulic diagram of a valve apparatus according to a third exemplary embodiment of the invention with a secondary pressure safeguard and with the elimination of the directional control valves.

The embodiment as shown in FIG. 3 differs from the two preceding embodiments in that neither directional control valves with latching positions as shown in FIG. 1 nor motorized 3/2 directional control valves according to the embodiment as shown in FIG. 2 are required. Rather in the solution as shown in FIG. 3, only two proportional pressure reducing valves 1A, 1B are used which acquire a secondary pressure safeguard via the respective back-pressure blocks 5. For the sake of simplicity, in FIGS. 2 and 3 in the embodiments there, the control 12 with its corresponding connection sites was not shown, but in this respect the embodiments relating to the solution as shown in FIG. 1 apply.

The valve apparatus according to the invention is advantageous in that in a modular construction it can also be retrofitted onto existing workpiece chucking fixtures in machine tools. As a result of the modular block structure of the valve apparatus, it takes up less installation space and is economical to implement because of the standard components which can be used.

While various embodiments have been chosen to illustrate the invention, it will be understood by those skilled in the art that various changes and modifications can be made therein without departing from the scope of the invention as defined in the appended claims.

What is claimed is:

1. A valve apparatus for setting and monitoring a clamping pressure of a clamping device for workpieces being clamped in the clamping device, comprising:
    a clamping device connection;
    a first pressure reducing valve for adjusting fluid pressure conveyed to said clamping device connection and having a mechanical self-locking device including self-locking gearing of a positioning motor triggered by a control;
    a first pressure sensor detecting pressure of the fluid pressure conveyed to said clamping device connection for adjustment to a definable setpoint clamping pressure; and
    first and second directional control valves switchable independently of one another, said first directional control valve being connected in a hydraulic supply circuit between said first pressure reducing valve and said clamping device connection.

2. A valve apparatus according to claim 1 wherein said pressure reducing valve comprises a proportional pressure reduction valve.

3. A valve apparatus according to claim 1 wherein said pressure sensor is connected to an electronic control.

4. A valve apparatus according to claim 1 wherein said pressure sensor is part of a programmable electronic control.

5. A valve apparatus according to claim 1 wherein each of said first and second directional control valves is at least a 3/2 directional control valve and supplies fluid pressure to said clamping device connection.

6. A valve apparatus according to claim 1 wherein an orifice is on an output side of said pressure reducing valve and has a volumetric size adjusted to the clamping device.

7. A valve apparatus for setting and monitoring a clamping pressure of a clamping device for workpieces being clamped in the clamping device, comprising:
    a clamping device connection;
    a first pressure reducing valve for adjusting fluid pressure conveyed to said clamping device connection and having a mechanical self-locking device;
    a first pressure sensor detecting pressure of the fluid pressure conveyed to said clamping device connection for adjustment to a definable setpoint clamping pressure; and
    first and second directional control valves switchable independently of one another, said first directional control valve being connected in a hydraulic supply circuit between said first pressure reducing valve and said clamping device connection, each of said first and second directional control valves being at least a 4/2 directional control valve and supplying fluid pressure to said clamping device connection.

8. A valve apparatus according to claim 7 wherein said mechanical self-locking device comprises self-locking gearing of a positioning motor triggered by a control.

9. A valve apparatus according to claim 7 wherein first and second check valves are connected in fluid communication to said clamping device connection and assumes a blocking position in a direction of said pressure reducing valve.

10. A valve apparatus according to claim 9 wherein said first and second check valves are connected to outputs of said first and second directional control valves, respectively, in fluid communication.

11. A valve apparatus for setting and monitoring a clamping pressure of a clamping device for workpieces being clamped in the clamping device, comprising:
    a clamping device connection;
    a first pressure reducing valve for adjusting fluid pressure conveyed to said clamping device connection and having a mechanical self-locking device;

a first pressure sensor detecting pressure of the fluid pressure conveyed to said clamping device connection for adjustment to a definable setpoint clamping pressure;

first and second directional control valves switchable independently of one another, said first directional control valve being connected in a hydraulic supply circuit between said first pressure reducing valve and said clamping device connection; and a second pressure reducing valve for adjusting fluid pressure conveyed to said clamping device connection being connected in a hydraulic circuit such that said second directional control valve is between said second pressure reducing valve and said clamping device connection, said first and second pressure reducing valves being switchable independently.

12. A clamping apparatus for setting and monitoring a clamping pressure on workpieces, comprising:

a clamping device;

a first pressure reducing valve for adjusting fluid pressure conveyed to said clamping device and having a mechanical self-locking device including self-locking gearing of a positioning motor triggered by a control;

a first pressure sensor detecting pressure of the fluid pressure conveyed to said clamping device for adjustment to a definable setpoint clamping pressure; and first and second directional control valves switchable independently of one another, said first directional control valve being connected in a hydraulic supply circuit between said first pressure reducing valve and said clamping device.

13. A clamping apparatus according to claim 12 wherein said pressure reducing valve comprises a proportional pressure reduction valve.

14. A clamping apparatus according to claim 12 wherein said pressure sensor is connected to an electronic control.

15. A clamping apparatus according to claim 12 wherein said pressure sensor is part of a programmable electronic control.

16. A clamping apparatus according to claim 12 wherein each of said first and second directional control valves is at least a 3/2 directional control valve and supplies fluid pressure to said clamping device.

17. A clamping apparatus according to claim 12 wherein an orifice is on an output side of said pressure reducing valve and has a volumetric size adjusted to the clamping device.

18. A clamping apparatus for setting and monitoring a clamping pressure on workpieces, comprising:

a clamping device;

a first pressure reducing valve for adjusting fluid pressure conveyed to said clamping device and having a mechanical self-locking device;

a first pressure sensor detecting pressure of the fluid pressure conveyed to said clamping device for adjustment to a definable setpoint clamping pressure; and first and second directional control valves switchable independently of one another, said first directional control valve being connected in a hydraulic supply circuit between said first pressure reducing valve and said clamping device, each of said first and second directional control valves being at least a 4/2 directional control valve and supplying fluid pressure to said clamping device.

19. A clamping apparatus according to claim 18 wherein said mechanical self-locking device comprises self-locking gearing of a positioning motor triggered by a control.

20. A valve apparatus according to claim 18 wherein first and second check valves are connected in fluid communication to said clamping device and assumes a blocking position in a direction of said pressure reducing valve.

21. A clamping apparatus according to claim 20 wherein said first and second check valves are connected to outputs of said first and second directional control valves, respectively, in fluid communication.

22. A clamping apparatus for setting and monitoring a clamping pressure on workpieces, comprising:

a clamping device;

a first pressure reducing valve for adjusting fluid pressure conveyed to said clamping device and having a mechanical self-locking device;

a first pressure sensor detecting pressure of the fluid pressure conveyed to said clamping device for adjustment to a definable setpoint clamping pressure;

first and second directional control valves switchable independently of one another, said first directional control valve being connected in a hydraulic supply circuit between said first pressure reducing valve and said clamping device; and a second pressure reducing valve for adjusting fluid pressure conveyed to said clamping device being connected in a hydraulic circuit such that said second directional control valve is between said second pressure reducing valve and said clamping device, said first and second pressure reducing valves being switchable independently.

* * * * *